United States Patent Office 3,382,287
Patented May 7, 1968

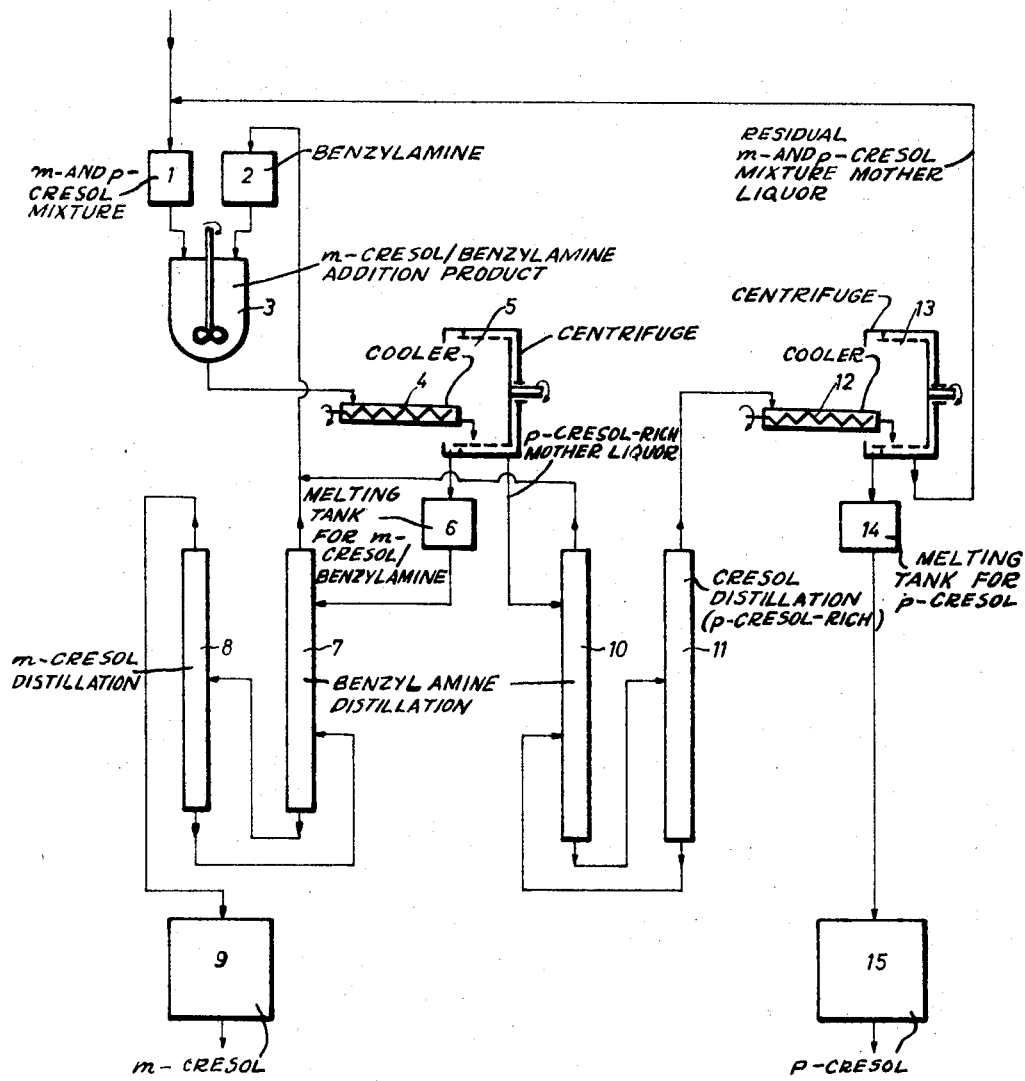

3,382,287
PROCESS AND DEVICE FOR THE SEPARATION OF m- AND p-CRESOL
Jürgen Fleischer, Leverkusen-Schlebusch, and Erich Meier, Cologne-Deutz, Germany, assignors to Farbenfabriken Bayer Aktiengesellschaft, Leverkusen, Germany, a German corporation
Filed Mar. 3, 1965, Ser. No. 436,845
Claims priority, application Germany, Mar. 13, 1964, F 42,305
2 Claims. (Cl. 260—621)

The present invention relates to the continuous separation of m- and p-cresol by crystallization.

No simple and economic process for the separation of a mixture of m- and p-cresol has so far been disclosed. A separation by means of distillation cannot be carried out economically since the boiling points of m- and of p-cresol only differ by 0.8° C. An unsuccessful attempt has also been made to carry out a distillation in the presence of a retaining agent. A further attempt has been made to separate m- and p-cresol by a chemical method, for instance by the alkylation of a cresol mixture with isobutylene, separation of the alkyl compounds and dealkylation, by sulphonation, separation of the sulphonic acids and elimination of the sulphonic acid group or by esterfication with oxalic acid and hydrolysis of the esters after they have been separated.

A mixture with a m-cresol content of between 42 and 89% cannot be separated at all by crystallisation since a molecular compound is formed from the two components. When the mixture contains more than 89% of m-cresol, it is possible to obtain pure m-cresol by crystallisation until the mother liquor contain 89% of m-cresol. Similarly, p-cresol can be separated from a mixture containing less than 42% of m-cresol until this composition has been reached.

The following process is nowadays in general use for the technical separation:

An isomer mixture of m- and p-cresol is treated with a cold saturated solution of urea in water. During this operation, an insoluble compound is formed from m-cresol and urea, and this is filtered off and decomposed with hot water. The m-cresol is extracted from this mixture with chloroform. The p-cresol can be isolated from the filtrate. This process employs 3 auxiliary materials (urea, water and chloroform) for the separation, it is cumbersome and therefore uneconomic.

Another separating process which has been described depends on the formation of a compound of m- and p-cresol with benzidine. This description states that it is possible to add benzidine to a cresol mixture and to separate the p-cresol as its solid benzidine compound while m-cresol remains in the mother liquor. However, an experimental repetition has shown that the two cresol-benzidine compounds form a eutectic mixture. As a result, the m-cresol can only be concentrated to a proportion of about 85% in the mother liquor.

It has now been found that an isomer mixture of m- and p-cresol can readily be separated by a continuous method when this isomer mixture is mixed with an approximately equivalent amount of benzylamine, the molecular compound of m-cresol with benzylamine is crystallised out as much as possible by cooling, the crystals are separated from the mother liquor, the crystals and the mother liquor are separately decomposed into benzylamine and m-cresol and into benzylamine and a cresol mixture rich in p-cresol, respectively, each in two columns operating at different pressures, pure p-cresol is obtained from the last mentioned mixture by cooling it, and the remaining mother liquor as well as the recovered benzylamine are passed back to the process.

The procedure is to be described in detail below:

An approximately equivalent amount of benzylamine is added to a mixture of m- and p-cresol and the mixture is cooled to —8° C. The m-cresol/benzylamine compound is precipitated during this operation. It is separated by centrifuging or filtering shortly before the whole mixture sets solid, it is remelted and decomposed into m-cresol and benzylamine by means of distillation or extraction. The recovered benzylamine can be employed again for the process. Benzylamine is removed from the fraction of the cresol-benzylamine mixture which has remained liquid and which mainly consists of the p-cresol/benzylamine compound by means of distillation or extraction. Pure p-cresol is obtained from the remaining residue by means of crystallisation. The mother liquor which still remains is subjected to the process once more together with a fresh mixture of m- and p-cresol.

The separation of the benzylamine from the cresol-benzylamine compounds has to be carried out by means of distillation in two columns connected in series and operating at different pressures because benzylamine is capable of forming azeotropic mixtures with cresol.

A device for carrying out the process according to the invention is shown in the drawing. The device consists of a storage vessel 1 for the cresol mixture and a storage vessel 2 for the benzylamine as well as a mixing vessel 3 with water cooling and a stirrer mechanism. It also includes a friction cooler 4, a centrifuge 5, a melting tank 6, the columns 7 and 8, a storage tank 9, the columns 10 and 11, another friction cooler 12, centrifuge 13, melting tank 14 and storage tank 15.

The following example is given for the purpose of illustrating the invention.

EXAMPLE 111 parts by weight of a mixture with 70% of m-cresol and 30% of p-cresol are treated with 110 parts by weight of benzylamine. The mixture becomes very hot during this operation. When it has been cooled to about 30° C., crystals of the m-cresol/benzylamine compound start to separate. The maximum attainable yield of this compound is achieved by cooling to —8° C. The mixture is now separated into crystals and mother liquor with the aid of a centrifuge, when residual mother liquor can be removed by rinsing the crystals with benzene. 139.4 parts by weight of crystals of the m-cresol/benzylamine compound (molar ratio of 1:1) and 81.6 parts by weight of the mother liquor with a composition of 50 mole percent of benzylamine, 9 mole percent of m-cresol and 41 mole percent of p-cresol are obtained altogether. The crystals are subsequently melted (melting point 39.5° C.) and the melt is freed from the small amount of benzene remaining from the washing operation in a small stripper. The separation of the benzylamine and the m-cresol is best carried out as a continuous operation, the liquid melt being passed to a distillation column. This column operates at an overhead pressure of 600 mm. Hg and an overhead temperature of 177° C. Its sump pressure is 760 mm. Hg and the temperature there is 210° C. It consists of 30 plates and operates at a reflux ratio of 1:15.4. The overhead take-off consists of benzylamine with a residual content of about 2% of cresol, which can be used again for a crystallisation of the m-cresol compound. The sump contents consist of an azeotropic mixture of 31.5% of benzylamine and 68.5% of m-cresol.

This mixture is introduced at the 9th plate of a second distillation column, whose characteristics are as follows:

| | |
|---|---|
| Overhead pressure _____ mm. Hg__ | 10 |
| Overhead temperature _____° C__ | 88.6 |
| Sump pressure _____mm. Hg__ | 85 |
| Sump temperature _____° C__ | 140 |
| Number of plates _____ | 25 |
| Reflux ratio _____ | 1:15.4 |

The overhead product consists of m-cresol with a residual content of 0.05% of benzylamine and the sump product consists of an azeotropic mixture with 33.3% of benzylamine and 66.7% of m-cresol. This is passed back to the 12th plate of the first column. Thus, the benzylamine is obained as the overhead product of the first column and the m-cresol as the overhead product of the second column. Since m- and p-cresol exhibit an almost identical behavior on boiling, it is possible to decompose the mother liquor in a distillation assembly whose operating characteristics are almost the same as those of the above described assembly except that the overhead product of the second column consists of a mixture of 18% of m-cresol with 82% of p-cresol instead of m-cresol. Since the amount of mother liquor is less, the dimensions of the construction of this assembly can be somewhat smaller. p-Cresol is thereafter obtained from the overhead product of the second column during the distillation of mother liquor, this product being rich in p-cresol. 41 parts by weight of this mixture are cooled to +2° C. and the crystallised p-cresol is centrifuged off. 22.5 parts by weight of p-cresol and 18.5 parts by weight of a mother liquor consisting of 42% of m-cresol and 58% of p-cresol are obtained, when the mother liquor can be passed back to the process by mixing it with the initial cresol mixture. A total of 70 parts by weight of m-cresol, 22.5 parts by weight of p-cresol and 18.5 parts by weight of a mixture consisting of 58% of p-cresol and 42% of m-cresol is thus obtained from 111 parts by weight of a mixture consisting of 70% of m-cresol and 30% of p-cresol.

The process is conducted by a continuous method in a device according to the drawing. An amount of 110 kg./hr. of the cresol mixture is added from storage vessel 1 and benzylamine is added from storage vessel 2 to the mixing vessel 3. The latter is provided with water cooling in order to remove the heat of mixing. The mixture is introduced into the friction cooler 4 at a temperature of 30° C. and it is there cooled down to −8° C. A pulp-like mixture of crystals of the m-cresol/benzylamine compound and of mother liquor leaves the friction cooler (the mother liquor consists of 50% of benzylamine, 9% of m-cresol and 41% of p-cresol). The continuous centrifuge 5 separates the crystals from the mother liquor. In order to achieve a good separation, it is still necessary to wash the crystals with a solvent (such as benzene, for example). However, for the sake of simplicity the circulation of the washing agent has been omitted in the drawing. The crystals originating from the centrifuge are melted in the melting tank 6 and passed to the upper third of the distillation column 7. This column operates at an overhead pressure of 600 mm. Hg. The overhead product consists of benzylamine (containing 1–2% of m-cresol) and this is returned to the storage vessel 2. The sump product from column 7 is passed to column 8. This column operates at an overhead pressure of 10 mm. Hg and produces m-cresol as its overhead product, which flows into the storage tank 9. The sump product from column 8 is passed back to the lower third of column 7. The mother liquor discharged from centrifuge 5 is decomposed into benzylamine and a mixture consisting of 18% of m-cresol and 82% of p-cresol in the distillation columns 10 and 11 by an analogous method. The benzylamine is also returned to the storage vessel 2, whereas the cresol mixture is cooled down to +2° C. in a friction cooler 12. p-Cresol separates in the form of solid during this operation and is separated from the mother liquor in a centrifuge 13. In this case, it is again necessary to remove residual mother liquor from the crystals by washing with a solvent before the crystals are melted in a melting tank 14 and flow into the storage tank 15. The mother liquor obtained in the centrifuge 13 is returned to storage tank 1.

We claim:

1. Process for the continuous separation of the respective isomers from a mixture of m-cresol and p-cresol by crystallization, which comprises combining continuously with the isomer mixture an amount of benzylamine equivalent to the corresponding molecular compound with the cresols, crystallizing from the reaction mixture obtained the resulting molecular compound m-cresol/benzylamine, subjecting the crystallized molecular compound m-cresol/benzylamine and the resulting mother liquor to separate azeotropic distillation and recovering separately the m-cresol from the benzylamine content of such molecular compound and the p-cresol from the mother liquor.

2. Process for the continuous separation of the respective isomers from a mixture of m-cresol and p-cresol by crystallization, which comprises combining continuously with the isomer mixture an amount of benzylamine equivalent to the corresponding molecular compound with the cresols, crystallizing from the reaction mixture obtained the resulting molecular compound m-cresol/benzylamine by means of cooling, separating the crystallized molecular compound m-cresol/benzylamine from the resulting mother liquor, subjecting such separated crystallized molecular compound and said mother liquor to correspondingly separate azeotropic distillation by conducting each through a respective pair of series-connected distillation zones, recovering separately the m-cresol from the benzylamine content of said molecular compound in a corresponding one pair of said zones and the p-cresol from said mother liquor in the corresponding other pair of said zones, and recycling the benzylamine distilled off from both such respective pairs of zones and the residual mother liquor to the combining step.

References Cited

UNITED STATES PATENTS

| | | | |
|---|---|---|---|
| 1,980,901 | 11/1934 | Bentley et al. _____ | 260—621 |
| 3,031,383 | 5/1962 | Millikan _____ | 260—621 |

OTHER REFERENCES

Horsley et al.: Azeotropic Data, Washington, D.C., American Chemical Society, 1952, pp. 203, 206.

LEON ZITVER, *Primary Examiner.*

H. ROBERTS, *Assistant Examiner.*